United States Patent [19]

Leszlauer

[11] 4,138,712

[45] Feb. 6, 1979

[54] PRODUCTION OF CAPACITOR ELEMENTS HAVING ESPECIALLY HIGH SPECIFIC ENERGY CONTENT

[75] Inventor: Zoltán Leszlauer, Gyor, Hungary

[73] Assignee: Licencia Találmányokat Értékesitö Vállalat, Budapest, Hungary

[21] Appl. No.: 501,285

[22] Filed: Aug. 28, 1974

Related U.S. Application Data

[63] Continuation-in-part of Ser. No. 312,058, Dec. 4, 1972, abandoned.

[30] Foreign Application Priority Data

Dec. 2, 1971 [HU] Hungary .................................. 634

[51] Int. Cl.$^2$ ........................ H01G 9/00; C25D 11/02
[52] U.S. Cl. ..................................... 361/433; 29/570; 204/27
[58] Field of Search .......................... 317/230; 204/27; 361/433; 29/570

[56] References Cited

U.S. PATENT DOCUMENTS

| | | | |
|---|---|---|---|
| 2,277,687 | 3/1942 | Brennan | 317/230 |
| 2,299,667 | 10/1942 | Waterman | 317/230 |
| 3,373,320 | 3/1968 | Krock et al. | 317/230 |
| 3,742,369 | 6/1973 | Douglass | 317/230 |

*Primary Examiner*—T. M. Tufariello
*Attorney, Agent, or Firm*—Haseltine, Lake & Waters

[57] ABSTRACT

A method for production of high storage capacity elements for electrolytic capacitors, comprising the steps of producing unetched metal filaments, oxidizing the filaments at a forming voltage so as to coat them with an oxide layer. To obtain high specific storage capacity, the radius of the metal filament ($r_1$) is determined in accordance with the maximum operating voltage (U) and the maximum field strength ($E_m$) of the dielectric so that the radius $r_1$ lies within the range of $$\frac{0.5U}{E_m} \text{ to } \frac{60U}{E_m}.$$

In an arrangement of the electrolytic capacitor with capacity elements made by this method, to reduce the unproductive volume, a plurality of capacitor elements are electrically connected in parallel while the oxide layers on adjacent capacitor elements are close to one another.

2 Claims, 4 Drawing Figures

PRODUCTION OF CAPACITOR ELEMENTS HAVING ESPECIALLY HIGH SPECIFIC ENERGY CONTENT

CROSS RELATED APPLICATION

This application is a continuation-in-part of Ser. No. 312,058 filed Dec. 4, 1972, now abandoned.

FIELD OF THE INVENTION

This invention relates to methods for the production of capacitors and to the capacitors resulting from such methods.

BACKGROUND

A large number of patents are directed to the production of electrolytic capacitors which are primarily used where high specific storage capacity is required. The dielectric used is generally an oxide of one of Al, Ta, Ti, and the like or, in other words, a material having excellent insulating characteristics. Existing electrolytic capacitors have high specific storage capacity due to these dielectrics.

A subsequent development is expected by experts to increase by different methods the surfaces of positive electrodes (by making aluminum foil spongy for instance). It is the unequivocal opinion of some experts that specific storage capacity depends geometrically on specific surface only.

In addition to the specific surface, however, other geometrical factors have not been accounted for, and as will be later seen, their part is important enough. It is believed that the influence of geometric factors and the advantages of regular orientation have not been sufficiently taken into consideration.

By way of information, German Pat. No. 1,464,816 might be mentioned. Though not relating to an electrolytic capacitor, nevertheless regular orientation has here already a part. Obviously, thin elementary threads, their orientation, and their utilization in the electrolytic capacitors are for themselves unimportant, but may determine the way.

The regular geometrical form, in this case a cylinder or its radius ($r_1$), is to be brought in a special way into a relationship with the applied maximum operating voltage (U) and with the known maximum field strength ($E_m$) of the dielectric.

From the point of view of specific storage capacity or energy content, optimal determination of the relation of the above three factors with respect to each other is important, but not the specific surface.

From mathematical verification and from graphical representations, it will be later seen that increasing the specific surface beyond a certain limit does not increase, but instead rapidly diminishes, the specific storage capacity.

SUMMARY OF THE INVENTION

The invention produces, by accounting for the above-mentioned factors, a thread-like electrolytic capacitor in which the factors commonly insure that the specific energy content should be a multiple of the present level.

It is an object of the invention to provide a method especially for the production of a capacitor element of high specific storage capacity.

As will be shown, this is achieved primarily for the purpose of an electric charge storing source, achieved by coordinating the radius ($r_1$) of the metal filaments to the maximum operating voltage (U) and to the known maximum field strength ($E_m$) of the dielectric in a way that it should satisfy as an optimum condition the equation $$r_1 = \frac{2U}{E_m}$$

and as a range of conditions the value of $r_1$ lies in the range of $$\frac{0.5U}{E_m} \text{ to } \frac{60U}{E_m}$$

A method is provided for the production of capacitor elements having especially high specific storage capacity. The method involves coordinating the radius of the metal filaments ($r_1$) to the permissible maximum operating voltage (U) and to the maximum field strength ($E_m$) of the dielectric so that $r_1$ lies in the range of $$\frac{0.5U}{E_m} \text{ to } \frac{60U}{E_m}$$

The capacitance of the capacitor element is established by $$C_f = \frac{\epsilon_o \epsilon_r 2\pi l}{\ln \frac{r_2}{r_1}}$$

where (see FIG. 1)
$r_2$ = outer radius of the oxide layer
$r_1$ = radius of the metal filament
$l$ = length of the capacitor element
$\epsilon_4$ = relative permittivity
$\epsilon_o$ = permittivity of vacuum.

There is electrolytically deposited a metal oxide layer on the metal filament. The surface of the oxide layer is surrounded with an electrolyte. A capacitor results from the above method which is consistent with the ranges set forth hereinabove. A plurality of parallel metal filaments may be provided on a common base and a plurality of corresponding outer cylinders may likewise be supported on a common base with the electrolyte arranged to surround the outer cylinders.

The thickness (t) of the oxide layer to establish the high specific storage capacity is given by the expression $$t = r_2 - r_1 = r_1 (e^{\frac{U}{r_1 E_m}} - 1)$$

DETAILED DESCRIPTION

Figure 1:
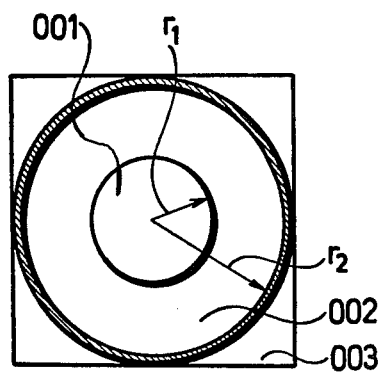
FIG. 1 is a diagrammatic view of concentric cylinders employed in accordance with the invention and illustrating the radii with which the description of the invention will be concerned.

Explanation of the method according to the invention is as follows:

Capacitance of coaxial cylinders may be calculated by the expression $$C = \frac{\epsilon_o \epsilon_r 2\pi l}{\ln \frac{r_2}{r_1}}$$

where (see FIG. 1)
$r_2$ = radius of the outer cylinder
$r_1$ = radius of the inner cylinder
$l$ = length of the cylinders
$\epsilon_r$ = relative permittivity
$\epsilon_o$ = permittivity of vacuum.

The specific capacitance is obtained by $$C_f = \frac{C}{V}$$

where $$V = r_2^2 \pi l$$

the volume of the cylinders $$C_f = \frac{\epsilon_o \epsilon_r 2\pi l}{r_2^2 \pi l \ln \frac{r_2}{r_1}} = \frac{2\epsilon_o \epsilon_r}{\left(\ln \frac{r_2}{r_1} r_2^2 \right)}$$

The maximum field strength of coaxial cylinders being $$E_m = \frac{U}{r_1 \ln \frac{r_2}{r_1}}$$

hence $$\ln \frac{r_2}{r_1} = \frac{U}{r_1 E_m}$$

therefore $$C_f = \frac{2\epsilon_o \epsilon_r r_1 E_m}{U r_2^2}$$

As a constant may be taken out $$k = \frac{2\epsilon_o \epsilon_r E_m}{U}$$

and therefore $$C_f = \frac{2\epsilon_o \epsilon_r E_m}{U} \cdot \frac{r_1}{r_2^2}$$

From this equation it might be seen that $C_f$ depends on the value of the relation $r_1/r_2^2$. Hereafter the extreme value and its location may be determined $$C_f = k \frac{r_1}{r_2^2}$$

-continued $$r_2 = r_1 e^{\frac{U}{r_1 E_m}}$$

Therefore $$C_f = k \frac{r_1}{r_1^2 e^{\frac{2U}{r_1 E_m}}} = k \frac{1}{r_1 e^{\frac{2U}{r_1 E_m}}}$$

$$C_f = k(r_1 e^{\frac{2U}{r_1 E_m}})^{-1} = k r_1^{-1} e^{\frac{-2U}{r_1 E_m}}$$

the first derivative of the function $$\frac{1}{r_1} \text{ is } -\frac{1}{r_1^2}$$

$$C_f' = k \left( \frac{1}{r_1^2} e^{-\frac{2U}{r_1 E_m}} + r_1^{-1} e^{-\frac{2U}{r_1 E_m}} \frac{2U}{r_1^2 E_m} \right)$$

$$C_f' = k \left( -\frac{e^{-\frac{2U}{r_1 E_m}}}{r_1^2} + \frac{r_1^{-1} 2U e^{-\frac{2U}{r_1 E_m}}}{r_1^2 E_m} \right)$$

$$C_f' = k \left( -\frac{1}{e^{\frac{2U}{r_1 E_m}} r_1^2} + \frac{2U}{E_m r_1^3 e^{\frac{2U}{r_1 E_m}}} \right)$$

The function has its extreme value when $C_f' = 0$ this is possible with $k \neq 0$ when $$C_f' = k \left( -\frac{1}{e^{\frac{2U}{r_1 E_m}} r_1^2} + \frac{2U}{r_1^3 E_m e^{\frac{2U}{r_1 E_m}}} \right) = 0$$

$$\frac{2U}{r_1^3 E_m e^{\frac{2U}{r_1 E_m}}} = \frac{1}{e^{\frac{2U}{r_1 E_m}} r_1^2}$$

$$\frac{2U}{r_1 E_m} = 1$$

and $r_1 = \frac{2U}{E_m}$.

This means that the specific capacitance (if U is unaltered) reaches its highest value with this $r_1$ value.

The method according to the invention is as follows:
Onto the surface of a basic metal thread or filament 001, a dielectric 002 which is the oxide of the basic metal is electrolytically deposited. In the capacitor, the individual parallel connected capacitor elements are surrounded by electrolyte 003.

In the method of manufacturing a high specific storage capacity element for capacitors, there are included the steps of producing metal filaments and oxidizing these filaments at a forming voltage so as to coat them with an oxide layer having a maximum field strength of $E_m$. The improvement of the invention includes employing unetched filaments of circular cross-section the radius of which lies within the range of $$\frac{0.5 U}{E_m} \text{ to } \frac{60 U}{E_m},$$

where U is the maximum operating voltage.

Preferably, the improvement includes employing a filament the radius of which amounts to $2U/E_m$ so as to obtain an optimum value of specific storage capacity.

Figure 3:
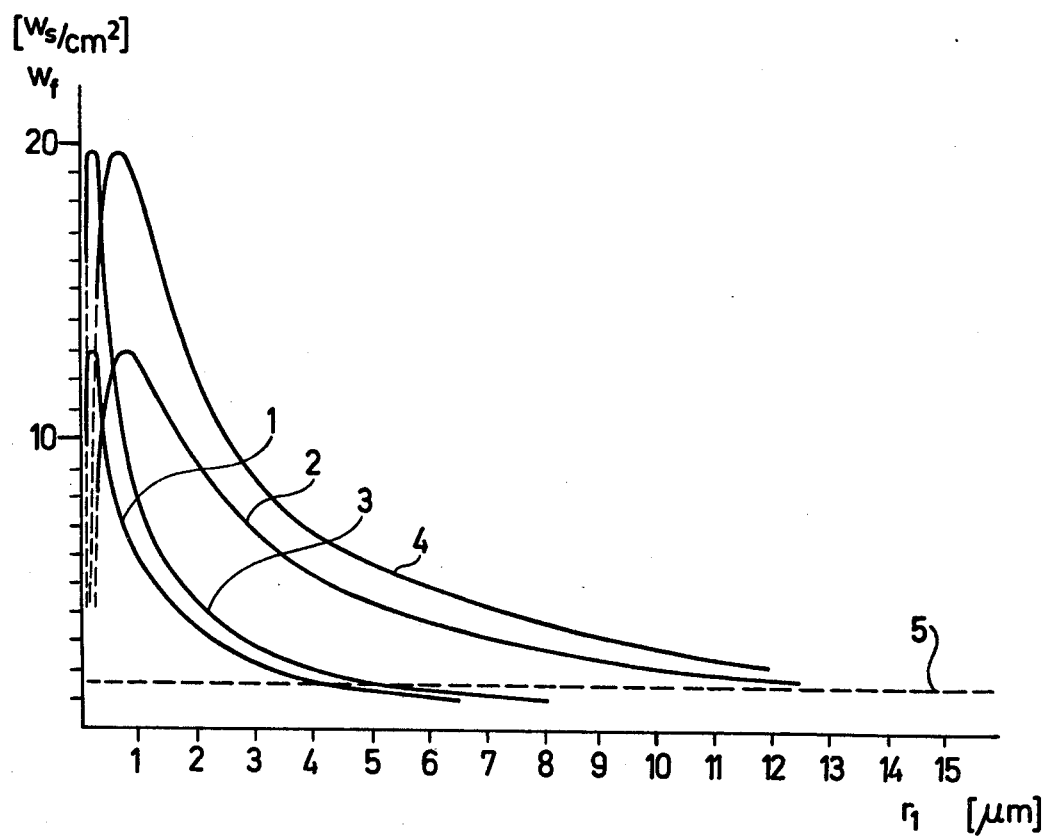
FIG. 3 is a chart showing the influence of the inner radius of the construction on the characteristics of a capacitor of the invention.

With other values or $r_1$, the function always gives a lower energy and capacitance value respectively. (FIG. 3, curve 2).

The thickness of the oxide layer is equal to $r_2-r_1$ and can be expressed by the relation $$r_1 e^{\frac{U}{r_1 E_m}} - r_1 = r_1 (e^{\frac{U}{r_1 E_m}} - 1)$$

Figure 2:
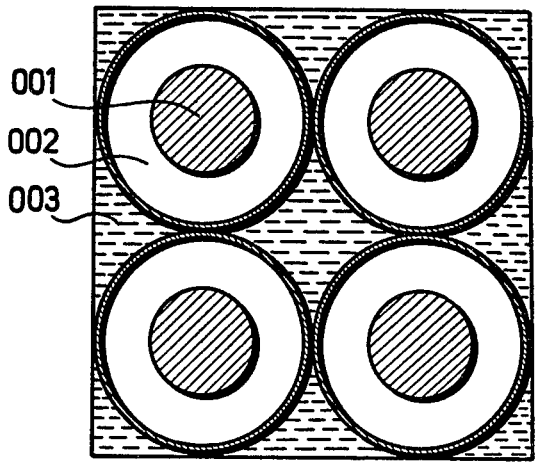
FIG. 2 is a diagrammatic view of one embodiment of the invention.
Figure 4:
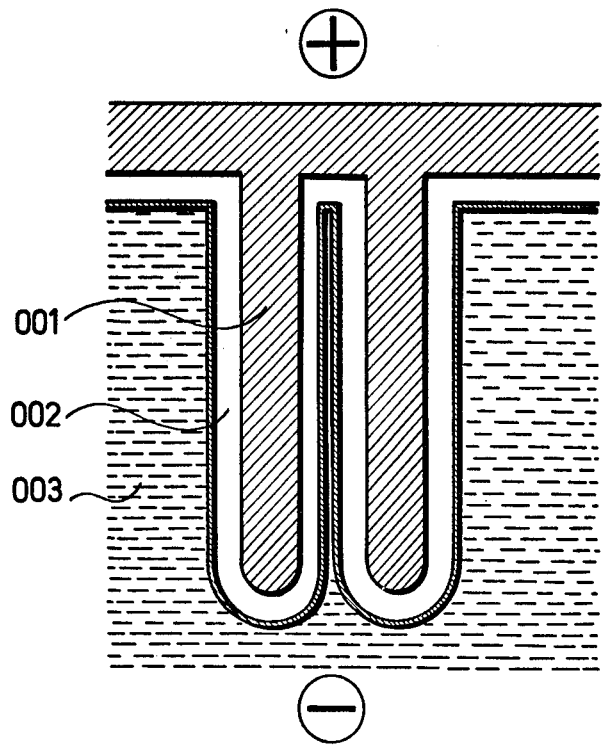
FIG. 4 is a longitudinal sectional view of the embodiment of FIG. 2.

The construction is shown in FIG. 2 in cross-section and in FIG. 4 in longitudinal section.

The following are some illustrative examples:

EXAMPLE 1

According to requirement, the maximum operating voltage of the capacitor is, in the case of aluminum electrolytic capacitors 450V.

In the present case this maximum operating voltage should be $U = 360$ V.

The maximum field strength of the dielectric is assumed to be $E_m = 0\ 10{,}000$ kV/cm.

This value depends on purity and technology of the material produced.

$$\epsilon_r = 10$$

Based on the above, optimal dimensions of the capacitor elements, the highest value of the specific capacitance and the specific storage capacity to be achieved may be determined by $$r_1 = \frac{2U}{E_m} = \frac{2 \times 0.36}{10{,}000} = 0.72 \times 10^{-4}\ \text{cm}$$

In this case the smallest thickness of the insulating layer depositing on the radium ($r_1$) of the metal filament will theoretically be $$r_2 = e r_1 e^{\frac{U}{r_1 E_m}}$$

$$r_2 = 0.72 \times 10^{-4} e^{\frac{0.36}{0.72 \times 10^{-4} \cdot 10^4}} =$$
$$0.72 \times 10^{-4} \cdot e^{0.5} = 1.195 \times 10^{-4}$$

The thickness of the insulating layer is equal to $r_2 - r_1$ and numerically is equal to $1.95 \times 10^{-4} - 0.72 \times 10^{-4} = 0.475 \times 10^{-4}$.

The specific capacitance $$C_f = \frac{2\epsilon_o \epsilon_r E_m}{U} \cdot \frac{r_1}{r_2^2} =$$
$$\frac{2 \times 0.885 \times 10^{-13} \times 10 \times 10^4 \times 0.72 \times 10^{-4}}{0.36 \times 1.195^2 \times 10^{-8}}$$

$$C_f = 2.5 \times 10^{-4}\ F/\text{cm}^3$$

The specific storage capacity (specific energy content)

$$W_f = \frac{1}{2} 360^2 \times 2.5 \times 10^{-4} = 16.2\ W\text{sec/cm}^3$$

From this 20% as unproductive volume are subtracted, which is filled out by the electrolyte around the thread.

```
  16.2
- 3.24
 12.96 Wsec/cm³
```

The actual specific energy content being 13 Wsec/cm$^3$.

EXAMPLE 2

The quality of the dielectric is unaltered (FIG. 3, curve 1).

So $$E_m = 10{,}000\ \text{kV/cm}$$

$$r = 10$$

The maximum operating voltage of the capacitor should be chosen for $U = 100$ V.

In this case too, the value of highest specific capacitance might similarly be determined, which increases, while the specific energy content remains unchanged. It is also to be seen on the curve that reduction of the maximum operating voltage (U) makes it pointed, so it rapidly changes. Reduction of radius $r_1$ below the value $$r_1 = \frac{2U}{E_m}$$

$r_1 = 2U/E_m$ though the specific surface increases, the specific capacitance and energy content respectively decrease. Beyond a certain limit, the rest current increases due to field inhomogenity and full break down may occur.

EXAMPLE 3

The maximum field strength has been increased to $E_m = 12{,}500$ kV/cm.

$$\epsilon_r = 10$$

$$U = 360\ V$$

In FIG. 3, curve 4 shows the variation.

EXAMPLE 4

$$E = 12{,}500\ \text{kV/cm}$$

$$\epsilon_r = 10$$

$$U = 100\ V$$

The reduced voltage gives a steep curve 3.

The examples enumerated hereabove proove that the size of the specific surface is not a determining factor. For instance, while with $r_1 = 5\ \mu$m a capacitor of 100 V voltage reaches not even the maximum of present energy level (about 1.5 Wsec/cm$^3$) with identical characteristics of the insulating material, and with the same dimensions, a specific energy content 3 to 5 times greater could be achieved. To this end, the voltage should be increased only.

The method is suited for storing high energies in a small volume, or is called for producing an apparatus of such characteristics. With dielectrics having a higher dielectric constant, also the specific energy content level of lead-acid storage batteries may be reached.

What is claimed is:

1. A method of producing high storage capacitor elements for electrolytic capacitors, said method comprising the steps of producing unetched metal filaments by drawing such that said metal filaments have a circular cross-section along its entire length with a radius $r_1$, and oxidizing said filaments at a forming voltage to coat them with an oxide layer having a thickness substantially equal to $$\frac{U}{r_1(e^{\overline{r_1 E_m}} - 1)}$$

wherein U is the maximum operating voltage and Em is the maximum field strength of the oxide layer, $r_1$ being equal to 2U/cm.

2. An electrolytic capacitor comprising a plurality of capacitor elements as claimed in claim 1 electrically connected in parallel, the oxide layers on adjacent capacitor elements being relatively close to one another.

* * * * *

UNITED STATES PATENT AND TRADEMARK OFFICE
CERTIFICATE OF CORRECTION

PATENT NO. : 4,138,712

DATED : February 6, 1979

INVENTOR(S) : Zoltan Leszlauer

It is certified that error appears in the above-identified patent and that said Letters Patent are hereby corrected as shown below:

Col. 2, line 41- change to read:

$$\epsilon_r = \text{relative permittivity}$$

Col. 3, line 15- change to read:

$$C = \frac{\epsilon_o \, \epsilon_r \, 2\pi \ell}{\ln \frac{r_2}{r_1}}$$

Col. 3, line 30- change to read:

$$V = r_2^2 \, \pi \ell$$

Col. 3, line 35- change the first expression of $C_f$ as follows:

$$\frac{\epsilon_o \, \epsilon_r \, 2\pi \ell}{r_2^2 \, \pi \ell \, \ln \frac{r_2}{r_1}}$$

Col. 3, line 66- change to read:

$$C_f = K \frac{r_1}{r_2^2}$$

UNITED STATES PATENT AND TRADEMARK OFFICE
CERTIFICATE OF CORRECTION

PATENT NO. : 4,138,712

DATED : February 6, 1979

INVENTOR(S) : Zoltan Leszlauer

It is certified that error appears in the above-identified patent and that said Letters Patent are hereby corrected as shown below:

Col. 4, line 15-change to read:

$$\frac{1}{r_1} \text{ is } -\frac{1}{r_1^2}$$

Col. 4, line 16-change to read:

$$C_f' = k \left[ -\frac{1}{r_1^2} e^{-\frac{2U}{r_1 E_m}} + r_1^{-1} e^{-\frac{2U}{r_1 E_m}} \frac{2U}{r_1^2 E_m} \right]$$

Col. 4, line 21-change to read:

$$C_f' = k \left[ -\frac{e^{-\frac{2U}{r_1 E_m}}}{r_1^2} + \frac{r_1^{-1} 2U e^{-\frac{2U}{r_1 E_m}}}{r_1^2 E_m} \right]$$

Col. 4, line 26-change to read:

$$C_f' = k \left[ -\frac{1}{r_1^2 e^{\frac{2U}{r_1 E_m}}} + \frac{2U}{E_m r_1^3 e^{\frac{2U}{r_1 E_m}}} \right]$$

UNITED STATES PATENT AND TRADEMARK OFFICE
CERTIFICATE OF CORRECTION

PATENT NO. : 4,138,712
DATED : February 6, 1979
INVENTOR(S) : Zoltan Leszlauer

It is certified that error appears in the above-identified patent and that said Letters Patent are hereby corrected as shown below:

Col. 4, line 35-change to read:

$$C_f' = k \underbrace{\left[ -\frac{1}{r_1^2 e^{\frac{2U}{r_1 E_m}}} + \frac{2U}{E_m r_1^3 e^{\frac{2U}{r_1 E_m}}} \right]}_{=0}$$

Col. 5, line 25-change to read:

$$E_m = 10,000 \text{ kV/cm}$$

Col. 5, line 44-change to read:

$$r_2 = r_1 e^{\frac{U}{r_1 E_m}}$$

Col. 5, line 46-change to read:

$$r_2 = 0.72 \times 10^{-4} e^{\frac{0.36}{0.72 \times 10^{-4} \times 10^4}}$$

Col. 5, line 47-change to read:

$$= 0.72 \times 10^{-4} e^{0.5} = 1.195 \times 10^{-4}$$

UNITED STATES PATENT AND TRADEMARK OFFICE
CERTIFICATE OF CORRECTION

PATENT NO. : 4,138,712
DATED : February 6, 1979
INVENTOR(S) : Zoltan Leszlauer

It is certified that error appears in the above-identified patent and that said Letters Patent are hereby corrected as shown below:

Col. 6, line 15- change to read:

$$\epsilon_r = 10$$

Col. 8, line 7-change to read:

$$\frac{2U}{E_m}$$

Signed and Sealed this

Sixth Day of May 1980

[SEAL]

Attest:

SIDNEY A. DIAMOND

Attesting Officer

Commissioner of Patents and Trademarks